(12) United States Patent
Bantz et al.

(10) Patent No.: US 7,475,135 B2
(45) Date of Patent: Jan. 6, 2009

(54) SYSTEMS AND METHODS FOR EVENT DETECTION

(75) Inventors: David F. Bantz, Portland, ME (US);
Thomas E. Chefalas, Somers, NY (US);
Steven J. Mastrianni, Unionville, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 11/096,659

(22) Filed: Mar. 31, 2005

(65) Prior Publication Data

US 2006/0224930 A1 Oct. 5, 2006

(51) Int. Cl.
*G06F 15/173* (2006.01)
(52) U.S. Cl. ...................................................... 709/224
(58) Field of Classification Search ................ 709/224; 714/4
See application file for complete search history.

(56) References Cited

U.S. PATENT DOCUMENTS

| 4,205,554 | A | * | 6/1980 | Uchida et al. ................. 73/626 |
| 4,731,680 | A | * | 3/1988 | Moriyama et al. ........ 360/78.13 |
| 5,235,580 | A | * | 8/1993 | Ogino ..................... 369/44.32 |
| 5,629,825 | A | * | 5/1997 | Wallis et al. .................. 361/64 |
| 5,832,407 | A | * | 11/1998 | Kai et al. .................... 701/205 |
| 6,097,520 | A | * | 8/2000 | Kadnier ...................... 398/106 |
| 7,127,743 | B1 | * | 10/2006 | Khanolkar et al. ............ 726/23 |
| 7,325,045 | B1 | * | 1/2008 | Manber et al. .............. 709/219 |

* cited by examiner

*Primary Examiner*—David Y Eng
(74) *Attorney, Agent, or Firm*—Ference & Associates LLC

(57) ABSTRACT

A system accesses a log of events on more than one computing system and scans these logs in an effort to determine the likely cause of various items of interest, events, or problems. These items of interest often include improper or frustrating behavior of a computer system, but may also include delightful or beneficial behaviors for which a user, group of users, company, service, or help desk seeks a cause. Once the likely source of the item of interest is found, a test may be performed to confirm the source of the problem and warning or corrective action taken.

1 Claim, 3 Drawing Sheets

SYSTEMS AND METHODS FOR EVENT DETECTION

FIELD OF THE INVENTION

The present invention relates generally to systems and methods for event detection and analysis. More specifically, this invention relates to determining causes of concerns encountered by users of computing systems.

BACKGROUND OF THE INVENTION

Computer use is becoming increasingly complex, as traditional operating systems are under continual attack by a panoply of malicious software agents including viruses, nonviral "malware," adware, spyware, and Web browser hijackers. Viral and nonviral threats are very serious concerns for consumers, service providers, help desks, and computer and software manufacturers. Additionally, operating systems may contain inefficiencies and errors that cause them to fail when a user runs a program or takes other seemingly innocuous actions. Consumer phone calls to help centers regarding spyware and adware typically require significant troubleshooting time. Usually the complaint is that the computer is performing slowly. Consumers often do not understand the differences among adware, spyware, worms, and viruses—and the lack of knowledge costs Internet service providers significant money.

Problems may arise on certain computer systems as a result of various kinds of user actions that trigger the installation of malicious software or computer registry changes. For example, a user may browse a web site, and malicious adware or spyware may then be installed on the user's system. Normally, a user (or an IT department of a company) does not know what web page is the source of the malicious software. Once known, it is possible to block or quarantine access to that site manually or automatically. The problem may not appear when the user visits a web site, but might appear when the user clicks a link from that web site that redirects the browser to another site, in a nonobvious manner, that contains the offending software.

Generally, if a computer expert has knowledge of a sequence of steps prior to the detection of a problem, knowledge of this sequence of steps can be use to pinpoint the cause of the problem. However, it is not always clear as to which one of a number of steps or events prior to a problem is the true cause of the problem. Thus, it becomes beneficial to examine the sequence of steps on several or many other systems for which another user, or the system itself, determines that a problem has occurred. When the problem occurs on more than one machine on a network, a system can query the other machines for the sequence of steps that led to the problem. The system can then compare and contrast the steps on these other machines to derive a probable common root cause with high likelihood.

As the number of problems such as adware is proliferating and computer operating systems are becoming more complex, a growing need has been recognized for providing systems, methods, and services that can most efficiently and effectively lead users, service providers, companies, help desks, and computer hardware and software manufacturers to determine likely causes of problems encountered in computing systems such as computers, cell phones, PDAs, and other network-connected devices.

Computer terrorism, as defined as the act of destroying or of corrupting computer systems with an aim of destabilizing a country or of applying pressure to a government, is also an area of concern which the system and method can address. Computer terrorism may involve attacks that modify the logic of a computing system in order to introduce delays or to make the system unpredictable. Attacks may also include the modification of information that is entering or exiting the system, without the user's knowledge.

SUMMARY OF THE INVENTION

In accordance with at least one presently preferred embodiment of the present invention, a system accesses a log of events on more than one computing system and scans these logs in an effort to determine the likely cause of various items of interest, events, or problems. These "items of interest" often include improper or frustrating behavior of a computer system, but may also include delightful or beneficial behaviors for which a user, group of users, company, service, or help desk seeks a cause. The term "delightful" may refer to any useful, helpful, or beneficial items of interest, for example, a system (or software) feature or behavior that a user or group of users finds useful and for which the user or group of users seeks a cause. Examples of these delightful or beneficial features include: a pleasing sound, image, response, font, keyboard shortcut, mouse behavior, or any useful software application feature associated with a user's interactions with a computing device. Users may be delighted when a task is easy to perform, if a graphical user interface is pleasing to the eye, if a problem or frustrating feature improves or is no longer encountered, and when the system or software behaves in a useful, efficient, easy-to-understand, or otherwise pleasing manner.

Systems that are included as part of this detection service may utilize a software agent that monitors local events. The events may be gathered by the agent, or the agent may scan one or more event logs on the systems to gain access to the event information. The agent monitors any requests to share its event information with another computer on the network. In another aspect of the invention, a server may be installed to collect the event information and perform event analysis and correlation. Such a server may either be a shared server or a peer server. In a peer server, there is no dedicated server, but rather process in one or more systems, which when coordinated, can collectively perform event analysis and correlation. Examples of software system implementing a peer model (distributed computing) are the Sun JTXA framework and the activities of the Global Grid Forum. Additional information on these systems may be found at sun.com and gridforum.org. In a shared server, there is a dedicated server which performs analysis and correlation. This detection service may also be provided for a fee by a service provider remotely from the systems on which the events occurred.

When a problem or item of interest is detected, the agent preferably queries other participants located on the local or wide area network for event information. In one aspect of the invention, the event data may be correlated locally, while in another aspect of the invention, the event data may be sent to a server or more powerful computer system for analysis and correlation.

Once the likely source of the problem is found, a test may be performed to confirm the source of the problem, and warning or corrective action taken. One or more systems on the network may preferably be queried for a recorded set of steps that led up to the occurrence of the problem.

Correlating an item of interest with a particular cause may be done automatically, without human intervention, by the detection service scanning for a common event or action on a plurality of machines prior to an item of interest. For example, if five users accessed a web page within a four-minute time window prior to the observation of intrusive pop-ads, and subsequently their web browsers crashed, then the event of browsing this web page is a likely cause of the item of interest, in this case, the production of intrusive pop-up ads. In other cases, likely causes of items of interest, such as computer problems, are less easy to find. In these cases, it is possible for a separate test computer to play back a sequence of events prior to an item of interest, to determine if the item of interest can be replicated. For example, the test computer can browse to the web site to determine if the pop-up ads are generated after browsing to this site. These kinds of tests or experiments may be performed in an automated fashion, without human intervention. These experiments may often concern infection of the test machine and may be conducted in a controlled and isolated manner on the test machine so that the entire machine is not infected or rendered inoperable. One way in which to create this isolation is through the use of a virtual machine in which the testing and experimenting is done. In this context, a virtual machine provides one or more execution environments on a single computer, isolated from one another. The host software which provides this capability is often referred to as a virtual machine monitor or hypervisor. Through the use of a virtual machine, which is computer software that isolates the experimentation from the rest of the computer, the detection service may test a sequence of steps without harming the test computer. Once the tests are conducted, the virtual machine can be terminated and any infections discarded. In this way, the virtual machine may execute the scenarios leading up to the problem. It gathers statistics and attempts to correlate the data from two or more systems to pinpoint the cause. Once the cause for item of interest (e.g. a problem) is determined, a fix for this problem may be supplied to the computing systems exhibiting the item of interest. Alternatively, the computer experiencing the problem may be "rolled back" to a state prior to the problem occurring. The concept of system "roll back" is well known to users of computers and often plays an integral part in modern operating systems. For example, sometimes a computer user installs a driver that renders a computing system unstable. Windows XP allows users to "roll back" a driver installation to the previously installed driver. More generally the System Restore feature of Microsoft Windows XP enables users, in the event of a problem, to restore their PCs to a previous state without losing personal data files.

In summary, one aspect of the invention provides a method of event detection in computer systems, the method comprising the steps of: detecting an item of concern or item of interest; determining at least one event near to the item of concern on more than one computer; correlating the at least one event with the item of concern; and thereafter determining at least one probable cause of the item of concern.

Another aspect of the invention provides an apparatus for providing event detection in computer systems, the apparatus comprising: an arrangement for detecting an item of concern or interest on more than one computer; an arrangement for determining at least one event near to the item of concern; an arrangement for correlating the at least one event with the item of concern; and an arrangement for thereafter determining at least one probable cause of the item of concern.

Furthermore, an additional aspect of the invention provides a program storage device readable by machine, tangibly embodying a program of instructions executed by the machine to perform method steps for event detection in computer systems, the method comprising the steps of: detecting an item of concern or interest; determining at least one event near to the item of concern on more than one computer; correlating at least one event with the item of concern; and thereafter determining at least one probable cause of the item of concern.

For a better understanding of the present invention, together with other and further features and advantages thereof, reference is made to the following description, taken in conjunction with the accompanying drawings, and the scope of the invention will be pointed out in the appended claims.

DESCRIPTION OF PREFERRED EMBODIMENTS

The present invention provides a detection service that facilitates the automatic localizing the cause of items of interest associated with computer systems.

Figure 1:
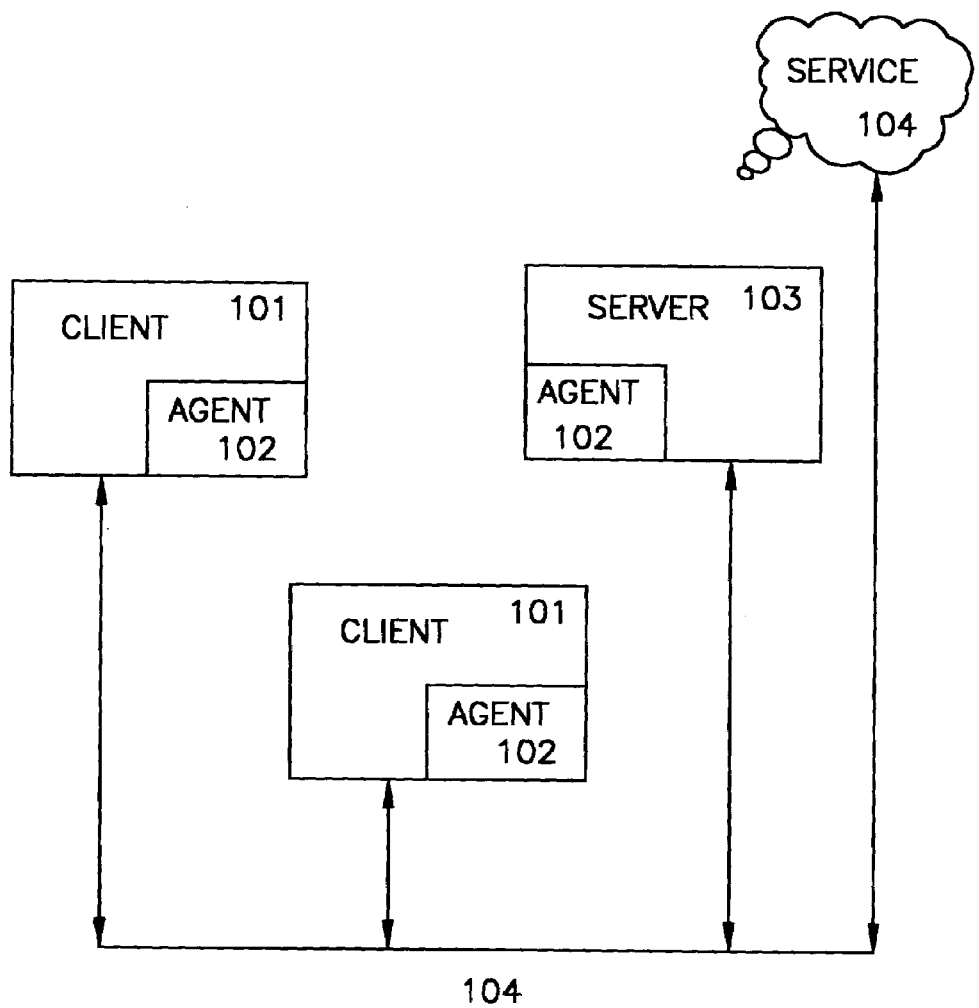
FIG. 1 provides a block diagram schematically illustrating an embodiment of the present invention.

With reference to FIG. 1, there is provided in accordance with at least one presently preferred embodiment of the present invention an agent 102 that is installed on a client 101 or server system 103 and that is responsible for tracking specific events. These events may be caused by software, the user, services provider, company, or group of users, and include, for example, such trackable events as mouse events, keyboard events, browser requests via http and ftp, mail events via SMTP, and various other events that could affect the functioning and response of a user's system, such as system 101. Often, the events of most interest will be those that may affect the system in a negative fashion, such as associated with adware, spyware, software installations, and viral and nonviral threats. However, these items of interest may also be beneficial or delightful occurrences for which a user, group of users, company, help desk, or service provider would like to find a cause. For example, if user A on a multiuser machine has installed a software application that makes keyboard key F1 display a useful list of recently edited files, user B may be delighted by this and wish to understand from where this feature has arisen. A help desk may wish to understand why a problem has suddenly gone away, which is another example of a "beneficial" item of interest.

Negative functioning of a computer can also be caused by simply plugging in a LAN cable, inserting a USB cable, or disabling a wireless password. Each of these kinds of acts can expose the system to threats. Preferably, a log will be created of such events, which can be used by the agent 102 as part of an overall detection service. The creation of event logs is well known in the prior art. For example, the Windows XP operating system generates an event log for various system, application, and security events. Events are sometimes classified by type such as "information," "warning," and "error."

Figure 2:
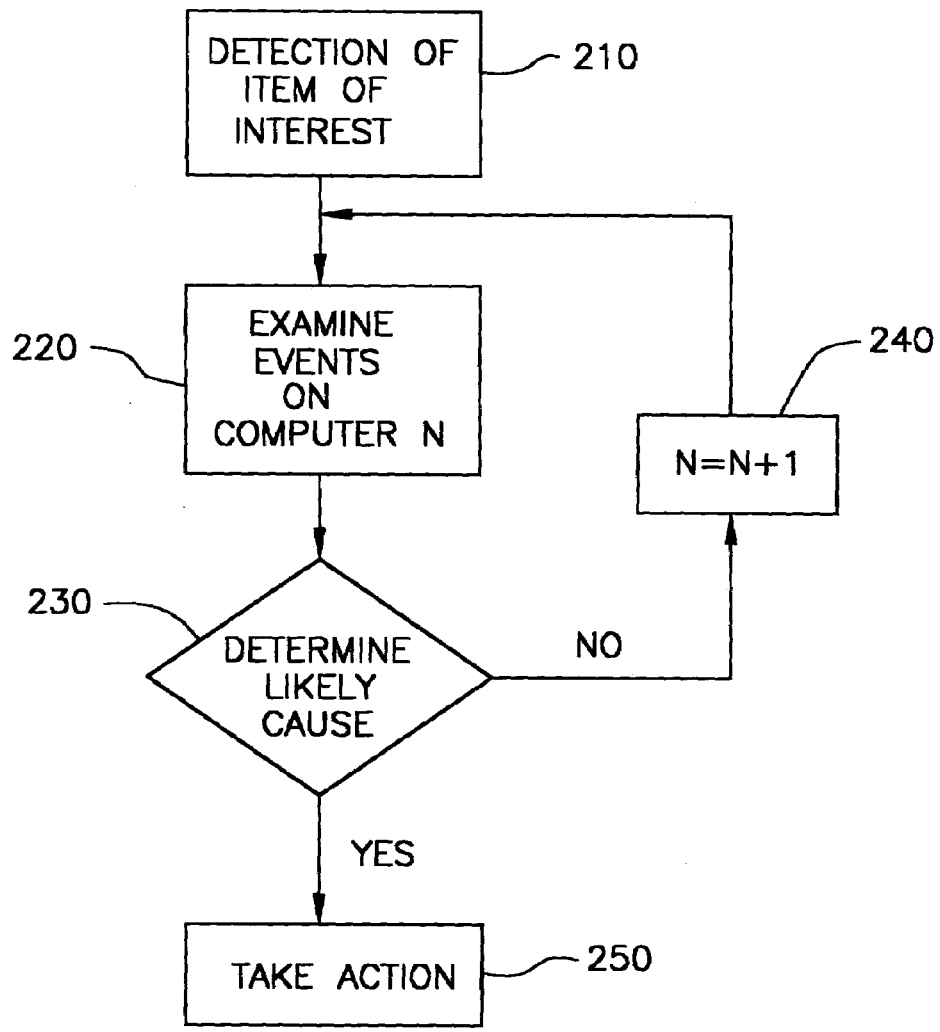
FIG. 2 is a flow chart showing a mechanism for determining likely causes for items of interest.

FIG. 2 is a flow chart showing a mechanism for determining likely causes for items of interest. In step 210, an item of interest is detected. For example, a user may notice that advertisements are popping up in an intrusive fashion. A company's IT department may suddenly notice unusually high Internet traffic coming from a user's machine. An automatic software agent may detect that adware or a virus is on a user's system. In step 210, a detection service agent, such as agent 102, scans events on the user's computer, designated as Computer 0 in step 220. In some instances, the correlation of an event (e.g. browsing to a particular web page) will be the obvious cause of an area of interest. However, sometimes it may be difficult to determine an exact cause because several events have occurred between the actual cause and detection of an item of interest. If a likely cause is not determine in step 230, then the detection service agent selects another computer (N+1) 240, and scans the event log on computer N+1, for example a remote computer. This process of scanning event logs on other computers is repeated until a likely cause is determined. If no cause is determined, then the agent may have to wait until more data is available.

In step 250, the agent may take some action. For example, it may report the likely cause of an area of interest. It may take a corrective action, for example, preventing this problem from happening again. For example, if a malicious web site is judged to be the cause of a problem, this web site may be blocked from user access in the future. If a bad computer driver is determined to be the cause of the area of interest, the driver may be fixed or replaced with a properly functioning driver.

It should be noted that in step 230, it is possible for a separate test computer, or even the users own computer 101, to playback a sequence of events prior to an item of interest, to determine if the item of interest can be replicated. For example, the test computer can browse to the web site to determine if the pop-up ads are generated after browsing to this site. These kinds of tests or experiments may be performed in an automated fashion, without human intervention on a virtual machine as already described.

Figure 3:
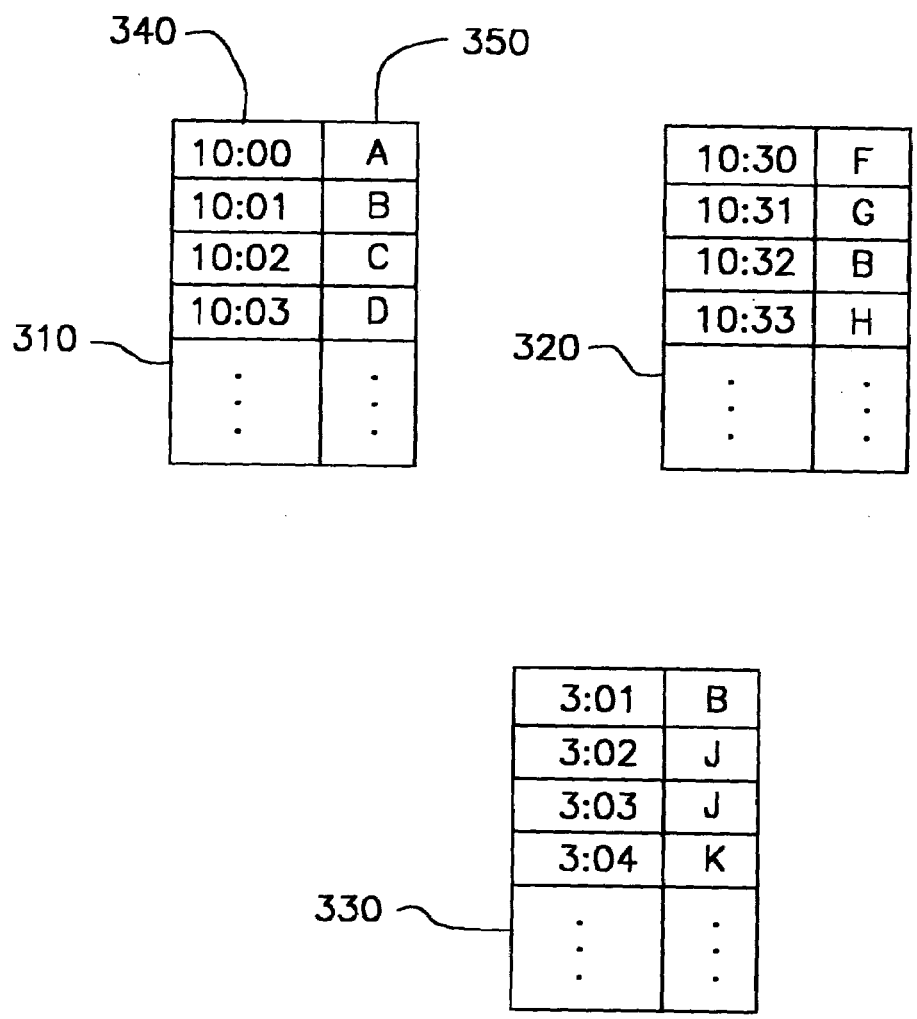
FIG. 3 is a presentation of one preferred embodiment of the event logs on more than one computer.

FIG. 3 is shows event logs 310, 320, and 330 on more than one computer. Each log has a time 340 and associated event 350. The detection service agent 102 may have access to these event logs via a network. Additionally, these event logs may be transferred from the various computers to another computer, for example a computer on which the agent 102 resides. If an item of interest is detected on a user's computer with associated event log 330, the agent 102 may determine that event "B", which occurred at 10:01 on one computer, 10:32 on another computer, and 3:01 on the user's computer is the likely cause, simply because all three users have reported the item of concern and all three users have event B occurring within a half-hour window of time prior to the item of concern.

It should be noted that when an item of interest (e.g. a problem, concern, or delight) is detected in step 210, the system agent 102 may transfer all or a portion of the event stream or logs 310, 320, 330 to optional server 103 or outside service 104. The server 103 attempts to decode the cause of the item of interest by examining the event list as described. If a number of items of interest are detected by several users, the system may assume that a serious item of concern has been encountered, which may trigger the search for a cause, or highly prioritize the search when many such searchers are underway. Once the likely cause has been determined, the server system 103 may take action as described in step 250, including repairing an infected machine or machines 101. A list of known causes of problems gradually evolves and may be available to users, IT shops, companies, groups of users, help desks, and to the agent 102. The server 103, client 101, or service 104 may maintain such lists and are updated to reflect a new patterns or signatures of cause of problems. (The combination of the events and the resulting errors may be considered as part of an overall signature.) Potential actions in step 250 also include "rolling back" the system configuration on computer 101 to the time prior to the events that caused the problem. It is possible that more than one event 350 is deemed to be the likely cause of an item of interest. Thus, the term "cause" may refer to a cluster of events that led to an item of interest.

Additional theoretical means for determining likely causes for an item of interest are now discussed. In particular, the arrangement via which two or more sequences of events can be compared and correlated will now be discussed. One example of such an arrangement would be a program to analyze a particular event sequence and hypothesize a finite-state acceptor for it. A finite-state acceptor is a mathematical abstraction that can easily be embodied in a program. The subject of finite-state acceptors is treated in the academic discipline of computational linguistics, as in the classic text "Introduction to Automata Theory, Languages and Computation," J. Hopcroft and J. Ullman, Addison-Wesley, 1979. A finite-state acceptor is a finite-state automaton with no outputs. Inputs to this automaton cause it to change state. If the final state of the automaton is found to be one of several designated as reflecting success, the input sequence is said to have been accepted.

The creation of a finite-state acceptor that represents a sequence of events that is the root cause of a problem (or item of interest) begins with one such sequence known to have caused the problem (or item of interest). A program analyzes that sequence and eliminates events that are known not to contribute to the creation of the problem. This elimination may be done through the application of heuristics, for example. The program then constructs a finite-state acceptor from the reduced sequence. The finite-state acceptor is then exercised with a second sequence of events known to have caused the problem. If the final state of the acceptor indicates that the sequence caused the problem, then the acceptor is considered to have been tested successfully. Additional testing may be required to improve confidence in the acceptor. If the final state of the acceptor does not indicate that the sequence caused the problem, a random alteration of the finite-state acceptor is then performed. This alteration may consist of the removal or addition of a single state. If the resulting acceptor works properly on both the original sequence and on the additional sequence it now becomes a candidate for general use.

The random alteration of the finite-state acceptor may be expanded to include additional transitions, or multiple state changes. A measure of distance may be used to determine how close a given acceptor is to determining whether a given event sequence has caused a problem, that measure of distance being the number of transitions between the final state and the nearest state indicating success.

This invention may be run as a service for a user, group of users, company, or service provider. Fees may be charged based on a number of criteria such as: access to other machines (step 240), prioritization of problem finding when more than one users seeks a cause, and nature of action taken in step 250. The precise nature of items of interest investigated, and how fast problems are repaired, may be a function of a service level agreement and service plan level.

In a further implementation of the present invention, a server can preferably be configured to collect and store the signatures and errors. The server can optionally query each system on the network for the particular signature and error code, and if found, implement automatically implement a corrective action by proactively repairing the error where it exists on other systems on the network.

As problems are identified and repaired, this information is preferably maintained and the information is used to form a set of "best practices" which can then by used to populate other machines and inform help desk personnel. For example, a web site may be banned, or certain e-mail automatically discarded, if they lead to the formation of any of the following entities: trojan horses (keyloggers and backdoors, which open up system 101 to attacker's control or use of system 101 to send spam emails), worms (which usually arrive as an email attachment and destroy data), dialers (which change the dial-in number of a modem connection to premium rate numbers causing high phone bills), spyware, adware, and hijackers (which cause Web browsers to behave improperly). Access to the banned site can be automatically disabled via software or by a firewall configuration.

A further aspect of the present invention provides the ability for the correlation component to provide proactive measures to combat future infections by developing a list of troublesome events and deploying those event lists to other computer systems to be used as set of recommendations or constraints to prevent future problems.

In view of the foregoing, it will be appreciated that there are broadly contemplated, in accordance with at least one presently preferred embodiment of the present invention, arrangements and methods of event detection in computer systems. Preferably, an item of interest may be detected. At least on event is preferably determined to be correlated with the item of interest. Thereafter, at least one probable cause of the item of interest is preferably determined.

Among other things, the item of interest may include at least one of: malfunctioning software, slow software, adware, spyware, at least one virus, corruption of information, defective I/O, defective network connectivity, browser hijacking.

In determining at least one event near to the item of concern, at least one event can preferably be analyzed within a predetermined time threshold on at least one machine. The at least one machine can comprise at least one of: a user's machine and a machine other than a user's machine.

A finite-state acceptor can preferably be employed to determine at least one event near to the item of concern.

Correlating at least one event with an item of concern may preferably involve either or both of: analyzing at least one event and an item of concern of a user; and analyzing at least one event and an item of concern of another user or user.

The determination of at least one probable cause can preferably involve testing a corrective method and ascertaining whether the corrective method adequately attends to the item of concern on one or more machines.

At least one event, among other things, could comprise at least one of: at least one mouse event; at least one keyboard event; at least one browser requests via at least one of http and ftp; at least one mail event via SMTP; running software; file creation; file alteration; software installation, hardware installation, at least one signature of a CPU, disk, I/O, or memory use. Operating systems may contain inefficiencies and errors that cause them to fail when a user runs a program or takes other seemingly innocuous actions. Thus, events may arise from normal system use.

It is to be understood that the present invention, in accordance with at least one presently preferred embodiment, includes an arrangement for detecting an item of interest, an arrangement for determining at least one event within a time to the item of interest, an arrangement for correlating the at least one event with the item of concern, and an arrangement for thereafter determining at least one probable cause of the item of concern. Together, these elements may be implemented on at least one general-purpose computer running suitable software programs. They may also be implemented on at least one integrated circuit or part of at least one integrated circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirely herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-method of event detection in computer systems, said method comprising the steps of:

detecting an item of interest, wherein the item of interest is a browser highjacking;

determining at least one event near in time to the item of interest in an effort to determine a probable cause of the item of interest, wherein said determining at least one event is undertaken via analyzing at least one event within a predetermined time threshold on at least one machine, wherein the at least one event is at least one browser request via file transfer protocol;

creating an event log of events determined, wherein each event is classified by a type consisting of: information, warning, and error;

correlating the at least one event with the item of interest, wherein said correlating consists of:

analyzing at least one event and an item of interest of another user; and thereafter determining at least one probable cause of the item of interest, said step of determining at least one probable cause comprises testing a corrective method and ascertaining whether the corrective method corrects the item of interest on one or more machines;

wherein a separate test computer plays back a sequence of events prior to an item of interest, to determine if the item of interest can be replicated, said separate test computer acts an automated fashion without human intervention; and wherein if a likely cause is not determined, then an event log of another computer is selected and scanned to determine a likely cause, this process of scanning event logs on other computers is repeated until a likely cause is determined;

reporting the likely cause of an item of interest to a user; and taking corrective action, wherein corrective action is preventing the at least one item of interest from occurring again.

* * * * *